Sept. 5, 1933.  O. WITTEL  1,925,553
GUIDE MEANS FOR A PHOTOGRAPHIC ROLL HOLDER
Filed Jan. 21, 1931  2 Sheets-Sheet 1
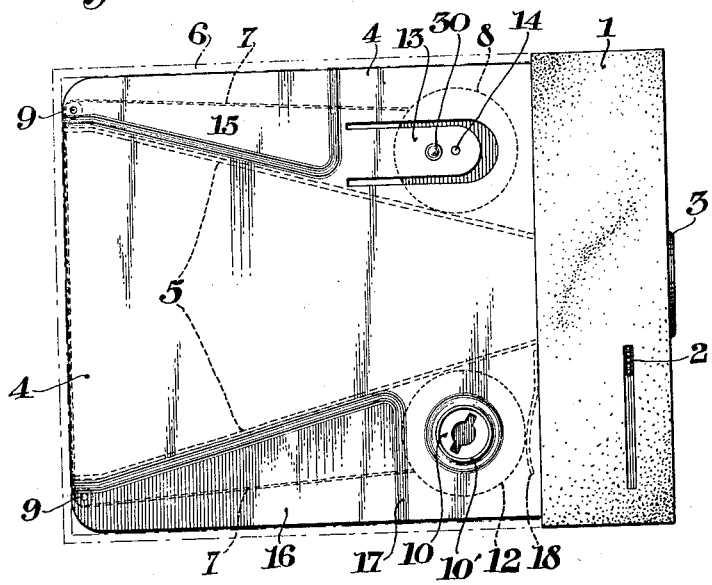
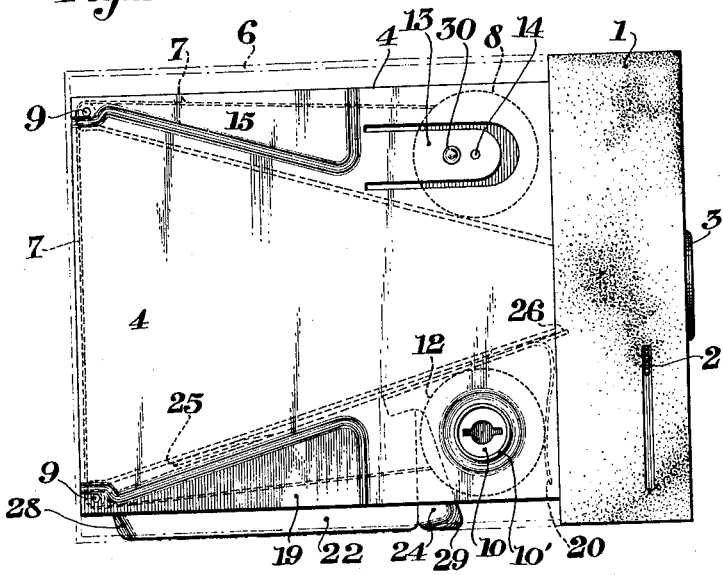
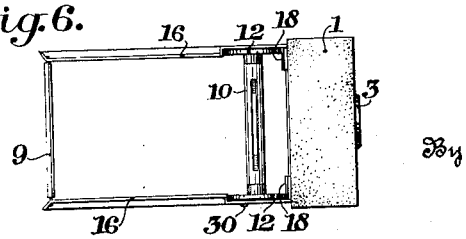

Sept. 5, 1933.   O. WITTEL   1,925,553
GUIDE MEANS FOR A PHOTOGRAPHIC ROLL HOLDER
Filed Jan. 21, 1931   2 Sheets-Sheet 2
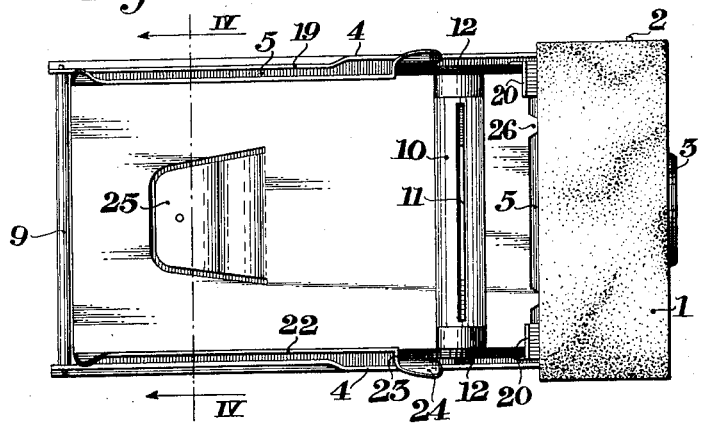
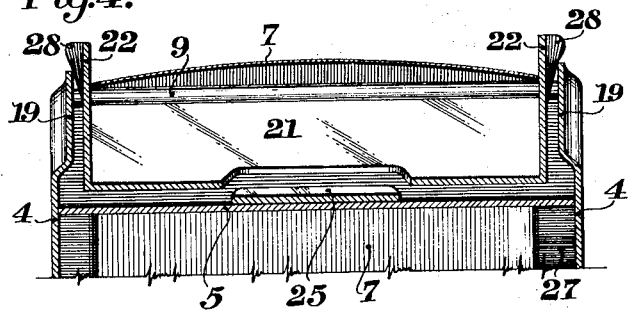
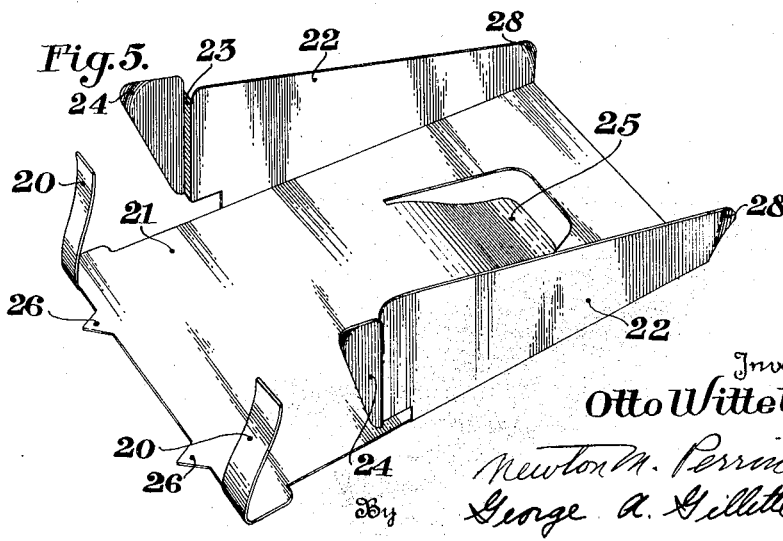

Patented Sept. 5, 1933

1,925,553

UNITED STATES PATENT OFFICE 1,925,553

GUIDE MEANS FOR A PHOTOGRAPHIC ROLL HOLDER

Otto Wittel, Rochester, N. Y., assignor to Eastman Kodak Company, Rochester, N. Y., a corporation of New York Application January 21, 1931. Serial No. 510,039

20 Claims. (Cl. 242—71)

The present invention relates to guide means for a photographic roll holder, and more particularly to a guide means for the roll material in the roll holder of a box camera.

The primary object of the invention is the provision of a guide means in a photographic roll holder which induces smooth and even take up of the roll material.

Another object of the invention is the provision of a roll holder which guides the take-up means so that the axis of rotation is in a plane substantially perpendicular to the camera casing.

A further object of the invention is the provision of a photographic holder embodying such a guide means.

A still further object of the invention is the provision of a guide plate for insertion into a photographic roll holder for contributing to smooth and even winding of the roll material.

Still another object of the invention is the provision of a guide means to effect simultaneous guiding of the roll material and take-up means.

Another object of the invention is the provision of a roll holder or a guide plate with guide walls having edges that abut the interior of the camera casing.

Other objects of the invention will be suggested to those skilled in the photographic, and especially the roll holding art, as the description of the invention is developed hereinafter. The above-mentioned and other objects of the invention are obtained by either transversely curving the roll material as it approaches the take-up means or insuring that the edges, preferably skived, of the roll material do not engage or rub against the flanges of the take-up reel, or both. The transverse curving of the roll material is accomplished by having guide walls spaced at a distance less than the width of the roll material, said guide walls either being integral with the walls of the roll holder, or being integral with a guide plate adapted to be inserted into the roll holder. The provision of end guiding means and guiding shoulders for the take-up spool prevents protrusion of the spool flanges into the space between the guide walls and confines the axis of rotation of the take-up spool to a plane substantially perpendicular to the camera casing, respectively.

Reference is made to the accompanying drawings wherein like reference numerals designate similar elements and wherein:

Fig. 1 is a side elevation of a camera front and roll holder having the guide means integral therewith.

Fig. 2 is a side elevation of a camera front and roll holder with the guide plate inserted therein.

Fig. 3 is a bottom view of Fig. 2 showing the camera front, roll holder and inserted guide plate.

Fig. 4, is a vertical transverse cross-section of the roll material, guide plates and roll holder on the line IV—IV of Fig. 3 viewed in the direction of the arrows.

Fig. 5 is a perspective view of the guide plate, and

Fig. 6 is a bottom view of Fig. 1 showing the guide-walls of the roll holder integral with the sides thereof.

The guide means of the invention is illustrated with respect to a box type of camera with the usual camera front 1, including a shutter operating lever 2 and a front collar 3.

In the illustrated embodiments of the invention a roll holder is attached to said camera front 1, said roll holder having side plates 4, upper and lower walls 5 between said side plates 4 converging toward the front of the camera. The camera casing 6 is shown in dash dot lines and is adapted to abut said camera front 1 to form a rectangular box.

The loading material for the camera comprises the usual light sensitive strip material (not shown) mounted in a known manner upon opaque strip material such as backing paper 7. Said material is preferably rolled upon a supply spool 8, and extends between the side plates 4 in more or less flat form and over rollers 9 rotatably mounted between rear depressed corners of side plates 4 to the take-up means. The take-up means may include a shaft 10 provided with a slot 11 and flanges 12 fastened to the ends of shaft 10. The opaque strip material such as backing paper 7 of the loading or roll material is preferably provided with skived edges and the roll material is slightly wider than the space between the flanges 12 of the take-up spool, so that the skived edges of the roll material are somewhat turned back and tightly abut against the inner faces of said flanges 12.

The side plates 4 are provided with U-shaped slots to form oppositely disposed resilient fingers 13 which have supporting studs 14 to rotatably support the ends of supply spool 8. One end of the take-up spool is also supported by a finger and stud, while the other end is simultaneously supported and turned by the winding key (not shown) inserted through a hole 10' in side plate 4. Rounded knobs 30 are placed on fingers 13 adjacent but on the side opposite supporting studs 14 and engage the interior of camera casing 6 to insure insertion of the studs 14 into the ends of the supply and take-up spools. This is especially important in respect to the resilient finger (not shown but exactly like fingers 13) which is opposite the hole 10' for the winding key.

The side plates 4 are also provided with oppositely disposed depressions 15 so that the facing surfaces thereof are spaced at a distance not less than the width of the roll material. A supply recess having sides made up of depressions 15 and side plates 4, and a bottom made up of upper wall 5 is thus formed in the roll holder, the recess becoming a supply chamber when the camera casing 6 is in place to provide a top. The depressions 15 are so spaced that they perform a guiding function only for the substantially flat roll material passing through the supply recess or chamber.

In the preferred modification of the roll holder, see Figs. 1 and 6, the side plates 4 are depressed to a greater depth than the depressions 15 to form oppositely disposed guide walls 16 having the inner faces thereof spaced at a distance less than the width of the opaque strip material and preferably the same or less than the distance between the inner surfaces of the spool flanges 12. A take-up recess is thus formed in the roll holder having a top provided by the lower wall 5 and sides made up of guide walls 16 and side plates 4. The camera casing 6 closes the recess to form a take-up chamber.

The guide walls 16 are gradually widened as they extend toward the front of the roll holder and form shoulders 17 at the junction of the guide walls and the side plates 4 and which are substantially perpendicular to casing 6. Shoulders 17 are adjacent to flanges 12 of the take-up spool and perform a guiding function therefor so that the axis of rotation of the take-up spool is confined to a plane parallel to shoulders 17 or substantially perpendicular to the camera casing 6.

A spring tensioning device 18 of the type disclosed in United States patent to Stuber et al, #1,494,719, of May 20, 1924, is attached to the rear of the chamber to resiliently and frictionally engage flanges 12 of the take-up spool and to insure continual contact of said flanges 12 with shoulders 17.

The side plates 4 in the modification according to Figs. 1 and 6 extend so as to slidably abut the interior of camera casing 6 and prevent the roll material from getting out of the supply or take-up chambers, binding between the edges of the roll holder and the camera casing, or tearing on the edges of the roll holder.

In another modification of the invention, illustrated in Figs. 2–5 inclusive, the roll holder is narrower and the edges of side plates 4 are in spaced relation to the interior of the camera casing 6. Also the depressions 15 are duplicated by depressions 19 along the lower rear edges of side plates 4, said depressions 19 having the inner faces thereof spaced at a distance not less than the width of the roll material. This form of roll holder is of a well known and extensively used type with the exception that spring tensioning devices 20 are not fastened to the rear of the camera front 1, as is true of the spring tensioning device 18.

A guide means such as a guide plate for this latter embodiment comprises a base plate 21 having perpendicular guide walls 22 integral with the side edges thereof, said guide walls 22 extending only a portion of the length of said base plate 21, being tapered toward one end edge and flared out at the upper end corners 28. Shoulders 23 are at right angles to and integral with said guide walls 22 while set-off portions such as ears 24, flared out at 29, are at right angles to said shoulders 23, parallel to said guide walls 22 and integral with shoulders 23. The base plate 21 is provided with a U-shaped cut out to form a spring tongue which is bent out of the plane of base plate 21 in a direction opposite to that in which the guide walls 22 extend.

Spring tensioning devices 20 are made integral with the other end edge of said base plate 21, extend beyond the side edges thereof to be opposite shoulders 23 and at a distance therefrom slightly less than the diameter of the flanges 12 of the take-up spool. Points 26 are spaced along the same edge of base plate 21 between the spring tensioning devices 20 and are adapted to engage the camera front 1 to assist in positioning the guide plate.

The guide plate is made of resilient sheet metal so that spring tensioning devices 20, guide walls 22, offset ears 24 and spring tongue 25 will have sufficient resiliency.

The guide plate is adapted to be inserted in the take-up recess of the roll holder between depressions 19 and to engage the camera front by means of points 26. The spring tongue 25 resiliently holds the guide plate in position shown in Fig. 2 and after the camera casing 6 is in place, said tongue 25 resiliently urges the edges of the guide walls 22 against the interior of said casing 6, and thus the roll material is prevented from leaving the take-up chamber or becoming damaged.

The underpressed portion in side plates 4 adjacent and abutting take-up spool flanges 12 in the modification of Fig. 1 have some resiliency and offset ears 24 of the guide plate are sufficiently resilient so that the take-up spool is prevented from any substantial endwise movement. Shoulders 17 and 23 also prevent movement of the take-up spool longitudinally of the camera roll material, said shoulders having widths not greater than the thickness of the flanges 12 which do not normally protrude beyond the guide walls 16 and 22, also, the spacing of guide walls 16 or 22 is not greater than the flange space or space between the inner faces of the take-up spool.

Since shoulders 17 and 23, offset ears 24 or said undepressed portions of side plates 4, are guides either for the edges or ends, respectively, for the flanges on the take-up spool, all of these elements are included in the generic term guiding surfaces used in the claims.

The roll material extends around the roll holder from supply spool 8 to the supply chamber, being guided by the inner surfaces of the depressions 15, over upper roller 9, past the flanges 27 of the exposure aperture at the rear of the roll holder, around the lower roller 9, through the take-up chamber, being guided and transversely curved by guide walls 16 or 22 and finally to the take-up spool. Since the guide walls 16 and 22 in these modifications are spaced at a distance less than the width of the roll material, the roll material during passage between said guide walls and during approach to the take-up means will be transversely curved, either conversely with respect to the roll holder, as shown in Fig. 4, concave with respect to the roll holder, in an elongated reverse curve, or in a sinuous curve. Irrespective of the form of the transverse curve in the roll material, the edges thereof will enter between the flanges of the take-up spool without rubbing on the flange edges and the winding of the roll material upon the spool will flatten out the transverse curve so that the edges of the roll material will tightly abut the inner surfaces of the flanges. It will thus be apparent that my invention comprises a camera or an attachment for a camera which will insure proper film winding under adverse conditions.

It should be noted that the preferred embodiment may be simplified by eliminating resilient fingers 13, supporting studs 14 and rounded knobs 30 so that the side plates 4 are solid adjacent the ends of the take-up and supply spools. Also the guide walls 16 may be duplicated along the opposite edges of the side walls 4 and a second spring tensioning device 20 inserted in the supply recess. Thus the supply and take-up spools may both be solely guided by shoulders 17, spring tensioning devices 20 and the undepressed portions of side walls 4 adjacent the ends of the spools. This simplification can readily be effected, should be obvious to those skilled in the art and result in a stronger and better construction for the roll holder.

Many changes and modifications in the roll holder and guide means are possible without departing from the scope of this invention, and the foregoing description is to be construed in an illustrative and not in a limiting sense, said scope of the invention being defined by the following claims.

Having now particularly described my invention, what I claim as new and desire to secure by Letters Patent of the United States is:

1. A roll holder for a box camera comprising side walls adapted rotatably to support a take-up spool having spaced end flanges, and guide means adapted transversely to curve film backing paper in said roll holder including guide walls integral with said side walls, spaced at a distance less than the spacing of the spool flanges, whereby said backing paper is evenly wound on said take-up spool.

2. A roll holder for a box camera comprising side walls adapted rotatably to support a take-up spool having spaced end flanges, and guide means adapted transversely to curve film backing paper in said roll holder including guide walls integral with said side walls spaced at a distance less than the flange spacing of said take-up spool, whereby the film backing paper is evenly wound on said take-up spool.

3. A roll holder for a box camera comprising side walls adapted rotatably to support a take-up spool having spaced end flanges, and guide means adapted transversely to curve film backing paper in said roll holder including guide walls integral with said side walls, spaced at a distance less than the flange spacing of said spool and forming shoulders with said guide walls adjacent said take-up spool, whereby the take-up spool is confined to rotation about an axis transverse to the roll holder.

4. A roll holder for a box camera comprising side walls adapted rotatably to support a take-up spool having spaced end flanges, and guide means adapted transversely to curve film backing paper in said roll holder including guide walls integral with said side walls, depressed from said side walls a distance not less than the thickness of said end flanges and spaced at a distance less than the width of said backing paper, whereby said backing paper does not rub against the edges of said end flanges.

5. In a photographic roll holder, the combination with a camera casing, a take-up chamber formed between said roll holder and camera casing, and a take-up means adapted to receive photographic strip material in said take-up chamber, of a guide plate within said take-up chamber having guide walls spaced at a distance less than the width of said photographic strip material and resilient means on said guide plate reacting against one wall of the take-up chamber and pressing the guide walls of the guide plate against the opposite wall of said chamber.

6. In a photographic roll holder, the combination with a take-up means having spaced flanges and adapted to receive photographic strip material, of a guide plate having guide walls and guiding surfaces abutting the flanges of said take-up means and preventing movement of the axis thereof longitudinally of said strip material.

7. In a photographic roll holder, the combination with a take-up spool having spaced flanges and adapted to receive film backing paper, of a guide plate having guide walls adapted transversely to curve said film backing paper and shoulders abutting the edges of said flanges, the width of said shoulders being not less than the thickness of the flanges of said take-up spool.

8. In a photographic roll holder, the combination with a take-up spool having spaced flanges and adapted to receive opaque strip material, of a guide plate having guide walls adapted transversely to curve said strip material and having offset ears abutting the ends of the flanges on said take-up spool whereby endwise movement of said spool is prevented.

9. In a photographic roll holder, the combination with a take-up chamber having top, bottom and side walls, a camera casing forming the bottom wall of said take-up chamber, and a flanged take-up means adapted to receive opaque strip material in said take-up chamber, of a guide plate within said take-up chamber having guide walls spaced at a distance less than the width of said opaque strip material, and an integral spring reacting against the top wall of the take-up chamber to press the edges of said guide walls against the interior of the camera casing.

10. A guide plate adapted transversely to curve photographic strip material and rotatably to guide a take-up means having spaced flanges comprising a base plate having guide walls spaced a distance less than the width of said photographic strip material and having guiding surfaces attached to said guide walls and adapted to abut and guide the flanges of said take-up means.

11. A guide plate adapted transversely to curve photographic strip material and rotatably to guide a flanged take-up means comprising a base plate having guide walls spaced at a distance less than the width of said roll material and having offset ears spaced at a distance less than the length of said take-up means and adapted resiliently to abut the ends thereof.

12. A guide plate for roll material in a photographic roll holder comprising a base plate and guide walls spaced at a distance less than the width of said roll material and adapted to engage the edges thereof, and a spring centrally located near one end of the base plate and extending therefrom in opposite direction from said side walls.

13. A guide plate for roll material in a roll holder for a box camera comprising a base plate having tapering guide walls spaced at a distance less than the width of said roll material adapted to engage the edges thereof and having offset ears at the wider end of said tapering guide walls in spaced relation to the end of said base plate.

14. A guide plate adapted transversely to curve photographic strip material and rotatably to guide a take-up spool having flanges comprising a base plate having spring tensioning devices integral with one end thereof and adapted to frictionally engage the edges of the flanges on said take-up spool, guide walls on said base plate, shoulders integral with said guide walls in spaced relation with said spring tensioning devices, whereby the opposite edges of the flanges of the spool are frictionally held without longitudinal movement.

15. The combination with a photographic roll holder adapted rotatably to support a flanged spool for photographic strip material including film and backing paper which is wider than the film and the flange spacing of said spool, of a guide means adapted transversely to curve said photographic strip material during the entry thereof onto said flanged spool.

16. The combination with a photographic roll holder provided with a take-up recess adapted to contain a flanged spool for photographic strip material including film and backing paper which is wider than the film and the flange spacing of said spool, of a guide means adapted transversely to curve said photographic strip material during movement thereof through said take-up recess and during entry into said flanged spool.

17. The combination with a photographic roll holder provided with a take-up recess adapted to contain a flanged spool for photographic strip material including film and backing paper which is wider than the film and the flange spacing of said spool, of a guide means having guide walls spaced at a distance less than the flange spacing of said spool and adapted transversely to curve said photographic strip material during entry thereof onto said flanged spool.

18. The combination with a photographic roll holder having side walls adapted rotatably to support a flanged spool for photographic strip material including film and backing paper which is wider than the film and the flange spacing of said spool, said side walls being spaced sufficiently to permit flattening of said backing paper, of a guide means adapted transversely to curve said photographic strip material and located to curve the same during entry onto said flanged spool.

19. The combination with a photographic roll holder adapted rotatably to support a flanged spool for photographic strip material which is wider than the flange spacing of said spool, of a guide plate having guide walls spaced at a distance less than the flange spacing of said spool and adapted transversely to curve said strip material during winding onto said spool.

20. The combination with a photographic roll holder provided with a take-up recess and adapted rotatably to support a flanged spool for photographic strip material which is wider than the flange spacing of said spool, of a guide plate for insertion into said take-up recess and having guide walls spaced at a distance less than the flange spacing of said spool and adapted transversely to curve said strip material during entry onto said spool.

OTTO WITTEL.